UNITED STATES PATENT OFFICE.

WILLIAM GODSON LINDSAY, OF NEW YORK, N. Y., ASSIGNOR TO THE CELLULOID COMPANY, A CORPORATION OF NEW JERSEY.

NON-INFLAMMABLE CELLULOSE COMPOUND AND METHOD OF MAKING SAME.

1,050,065.     Specification of Letters Patent.     Patented Jan. 7, 1913.

No Drawing.     Application filed May 5, 1909. Serial No. 494,178.

*To all whom it may concern:*

Be it known that I, WILLIAM GODSON LINDSAY, a citizen of the United States, residing at New York, in the county of New York and State of New York, have invented certain new and useful Improvements in Non-Inflammable Cellulose Compounds and Methods of Making Same, of which the following is a full, clear, and exact specification.

This invention relates to a new composition of matter which is non-inflammable, and which possesses permanently great strength and tenacity, and can be used as a substitute for nitro-cellulose compositions such as celluloid and similar substances, and also to the process of making the same.

Heretofore, it has been proposed to substitute acetyl cellulose for nitrocellulose for the purpose of obtaining a less inflammable material having the properties of celluloid, but so far as I am aware such compounds have been unsuccessful.

I have discovered that triphenylphosphate can be combined with acetyl cellulose to produce a non-inflammable compound having great strength and tenacity, and other valuable properties, and the present invention is designed to point out to the operator a practical method of using or combining these two substances in making films and other forms of such compounds. So far as I know, I am the first to successfully use triphenylphosphate with acetyl cellulose, and also the first to discover the method of making a useful product or compound containing acetyl cellulose and triphenylphosphate.

In carrying out my invention I dissolve an acetylcellulose in a solvent which is also a solvent of triphenylphosphate and to this solution is added triphenylphosphate, either in solid form or previously dissolved in acetone or other suitable solvent. Within the broad scope of my invention I do not confine myself to any particular variety of acetylcellulose but include the varieties of acetylcellulose which are not freely soluble in acetone, as well as the particular variety of acetylcellulose which is soluble in acetone. The amount of triphenylphosphate may be varied in proportions from ten to twenty parts by weight to each one hundred parts of the acetyl cellulose, and the acetone or other suitable solvent is added in sufficient quantity to make either a flowable solution or a plastic mass, as is well understood by those skilled in the art; but I do not limit myself to any specific proportions because they may be diminished or increased as desired. The resulting mixture is suitably manipulated to permit a portion of the solvent to evaporate, whereby a certain portion of the solvent employed will be evaporated according to the length of time of the manipulation, the temperature employed, and other conditions, as is well understood in the art. In the example given above, showing the use of acetone as a part of the solvent, a certain portion of the acetone evaporates, as well as certain proportions of such other solvents which may be employed.

The degree of strength and tenacity of the product will depend upon the variety of acetyl cellulose employed in solution or in combination or mixture as the basic ingredient; but the addition of triphenylphosphate increases both the strength and tenacity and also insures non-inflammability. I may use other menstrua or solvents than acetone, such for instance as chloroform, ethyl acetate or acetylene tetrachlorid, which, either alone or when two or more of them are mixed together, are capable of dissolving the acetyl cellulose in the presence of triphenylphosphate.

As indicated above, the solvent or menstruum may be formed of one or more substances in addition to, or in substitution of, acetone; in fact, any one or more of the solvents or menstrua of an acetyl cellulose, or similar cellulose compositions, may be employed, provided the solvent is also a solvent of the triphenylphosphate or other substance used in place thereof. A further advantage in employing these solvent or menstrua substances in the case of some of the heavy solvents arises from their property of restraining or modifying the volatility of the mixture; acetylene tetrachlorid, when used alone, or with chloroform, alcohol, ethyl acetate or the like, in varying proportions, is especially useful in this connection. The addition of 1½% urea will insure permanency of strength and tenacity to the compound. The proportion of urea or equivalent substance will vary according to the desired degree of stability of final product. A proportion of two parts urea to one hundred parts of the cellulose compound gives most excellent results; a less proportion is sufficient for ordinary purposes. I have obtained satisfactory results with a proportion of urea as low as one part to one hundred parts of the cellulose compound.

For certain purposes, it is advantageous to make a thorough mechanical mixture containing the acetyl cellulose and triphenylphosphate, or equivalent substances, and subsequently add the solvent or liquid menstruum.

The product made in accordance with my invention can be made in the form of films or thin sheets. Any approved method of forming films or thin sheets from a flowable solution may be employed. It will be understood, also, that the flowable solution formed as above described may be applied as a protecting surface, such a coating possessing also the property of being waterproof. The final product may also be made in the form of a mass of any desired thickness. It will be obvious that suitable pigments or coloring matter may be added to the above mixture or solution to produce a final product for use in imitating other substances, such as amber, ivory, horn, marble, or the like.

Having thus described my invention, I declare that what I claim as new and desire to secure by Letters Patent, is:

1. A composition of matter containing acetyl cellulose and triphenylphosphate in admixture with a solvent common to both, substantially as described.

2. A composition of matter containing acetyl cellulose and triphenylphosphate in admixture with acetone.

3. A composition of matter containing an acetyl cellulose and triphenylphosphate in admixture with acetylene tetrachlorid and acetone.

4. A composition of matter containing one hundred parts of acetyl cellulose and from ten to twenty parts of triphenylphosphate in admixture with acetylene tetrachlorid and acetone.

5. A composition of matter containing one hundred parts of acetyl cellulose, from ten to twenty parts triphenylphosphate, from one to two parts urea, acetylene-tetrachlorid and acetone.

6. A composition of matter containing an acetyl cellulose compound in combination with triphenylphosphate, and a substance for insuring permanency of strength and tenacity.

7. A composition of matter containing an acetyl cellulose compound, triphenylphosphate and urea.

8. A composition of matter containing an acetyl cellulose compound, triphenylphosphate, urea and acetone.

9. The process of making a non-inflammable composition of matter consisting in combining 100 parts of acetyl cellulose and from 10 to 20 parts of triphenylphosphate by the use of a solvent common to both.

10. The process of making a non-inflammable composition of matter consisting in combining an acetyl cellulose and triphenylphosphate by the use of a solvent composed of a mixture of acetylene-tetrachlorid and acetone.

11. The process of making a non-inflammable composition of matter, which consists in combining acetyl cellulose and triphenylphosphate by the use of a solvent common to both.

12. The process of making a non-inflammable composition of matter, which consists in combining an acetyl cellulose and triphenylphosphate by the use of acetone.

13. The process of making a non-inflammable composition of matter, which consists in combining an acetyl cellulose and triphenylphosphate by the use of a solvent common to both and adding urea.

14. A composition of matter containing an acetyl cellulose not freely soluble in acetone alone, and triphenylphosphate dissolved in a mixture containing acetylene tetrachlorid and acetone.

In testimony whereof I affix my signature in presence of two witnesses.

WILLIAM GODSON LINDSAY.

Witnesses:
  HENRY J. LUCKE,
  GEO. N. KERR.